Nov. 21, 1933.  M. F. CARR  1,936,378
SWIVEL
Filed July 5, 1932
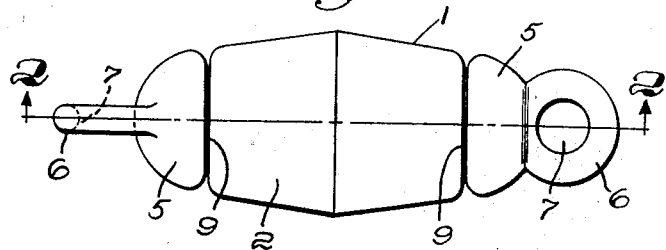
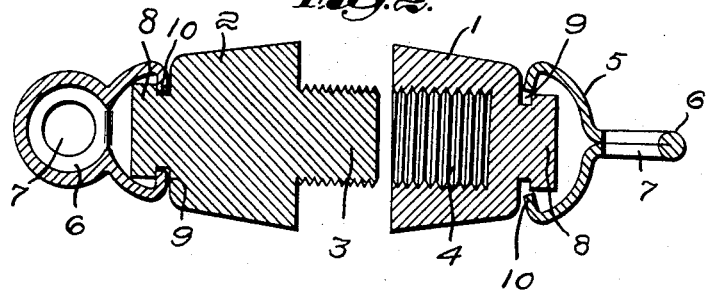
Inventor:
Moses F. Carr,
by Emery, Booth, Varney & Townsend
Attys

UNITED STATES PATENT OFFICE 1,936,378

SWIVEL

Moses F. Carr, Lincoln, Mass., assignor to United-Carr Fastener Corporation, Cambridge, Mass., a corporation of Massachusetts Application July 5, 1932. Serial No. 620,814

2 Claims. (Cl. 24—230)

My invention aims to provide improvements in swivels.

In the drawing which illustrates a preferred embodiment of my invention:—

Figure 1 is a plan view of a swivel connector for necklaces and the like; and

Fig. 2 is a section taken on the line 2—2 of Figure 1, the two parts of the connector having been separated.

Referring now to the specific embodiment of my invention selected for illustration by the drawing, I have shown a simple efficient swivel connector device which is particularly, though not exclusively, adapted for use as a connecting means for the ends of a necklace or similar device. The particular device shown has what may be termed a barrel which is divided into two portions 1 and 2 adapted to be engaged by a screw threaded male portion 3 provided on the portion 2 and adapted to make threaded engagement into the threaded bore 4 in the portion, 1, as best illustrated in Fig. 2.

On each end of the barrel member I have provided a sheet metal swivel member usually permanently connected to the end of a string of beads, chain, or other necklace structure. Each swivel member is formed from a single piece of sheet metal and has a hollow portion 5 at one end and a flattened portion 6 at the other end, as illustrated. The flattened portion is provided with an aperture 7 so that that end provides in effect an eye to permit connection with a chain, link, string, or the like.

The connection between the member 1 and one of the swivel members is made by means of a boss 8 extending from the member 1 and having a groove 9 thereby providing a headed boss. The hollow end 5 of the swivel is open at one end and has an inwardly turned flange 10 at the open end which fits loosely into the groove 9 in the boss 8 (Fig. 2) thereby permitting free relative rotation of the parts. Thus, the parts 1 and 2 may be rotated relative to each other and relative to their swivel members for engagement of the male screw portion into the threaded bore without twisting the means to which the swivels are attached.

The manner of attachment of the swivels to the members 1 and 2 is simple and can be accomplished by an automatic machine. When the swivels are formed prior to attachment the apertured end is shaped as shown at the right of Fig. 2, the aperture surrounded by the flange 10 being large enough to admit the head of the boss 8 as illustrated. Thereafter a suitable squeezing mechanism reduces the diameter of the hollow portion 5 and forces the flange 10 into the groove 9 to complete the attachment, as shown at the left of Fig. 2.

While I have illustrated and described a preferred embodiment of my invention, I do not wish to be limited thereby, because the scope of my invention is best defined by the following claims.

I claim:—

1. A swivel connector comprising a separable member having a bulbous end and a hollow sheet metal member of substantially uniform thickness having a flattened portion apertured for connection with a flexible member and a hollow open ended portion having a flange squeezed over the bulbous end of the separable member to attach the two members together in freely rotatable relation.

2. A swivel connector comprising, in combination, separable members adapted to be engaged and disengaged by relative rotation, each of said separable members having a headed boss on one end and a one-piece pressed sheet metal swivel of substantially uniform thickness having a hollow end portion receiving the headed end of the boss and having a flange squeezed into a position behind the headed end of the boss to attach the swivel member to the connecting member thereby permitting free rotation of the connecting member relative to the swivel member.

MOSES F. CARR.